(12) United States Patent
Srinivas et al.

(10) Patent No.: US 8,768,239 B2
(45) Date of Patent: Jul. 1, 2014

(54) METHODS AND SYSTEMS FOR CLUSTERING STUDENTS BASED ON THEIR PERFORMANCE

(75) Inventors: Sharath Srinivas, Webster, NY (US); Eric Scott Hamby, Webster, NY (US); Robert M. Lofthus, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 215 days.

(21) Appl. No.: 13/107,543

(22) Filed: May 13, 2011

(65) Prior Publication Data

US 2012/0288841 A1  Nov. 15, 2012

(51) Int. Cl.
| | | |
|---|---|---|
| *G09B 3/00* | (2006.01) | |
| *G06F 17/30* | (2006.01) | |
| *G09B 7/02* | (2006.01) | |
| *G09B 7/00* | (2006.01) | |
| *G09B 7/04* | (2006.01) | |
| *G09B 5/14* | (2006.01) | |
| *G09B 7/08* | (2006.01) | |

(52) U.S. Cl.
CPC .............. *G06F 17/3071* (2013.01); *G09B 7/02* (2013.01); *G09B 7/00* (2013.01); *G09B 7/04* (2013.01); *G09B 5/14* (2013.01); *G09B 7/08* (2013.01); *Y10S 707/99944* (2013.01); *Y10S 707/99945* (2013.01); *Y10S 706/927* (2013.01); *G06F 17/30994* (2013.01); *G06F 17/3025* (2013.01)
USPC ............. 434/350; 707/999.103; 707/999.104; 706/927

(58) Field of Classification Search
CPC .............. G09B 7/02; G09B 7/00; G09B 7/04; G09B 5/14; G09B 7/08; Y10S 707/99944; Y10S 707/99945; Y10S 706/927; G06F 17/3071; G06F 17/30994; G06F 17/3025
USPC .................. 434/322, 323, 350, 353, 362, 365
See application file for complete search history.

(56) References Cited

U.S. PATENT DOCUMENTS

| | | | | |
|---|---|---|---|---|
| 3,721,807 | A * | 3/1973 | Miller et al. .................. | 434/355 |
| 6,728,752 | B1 * | 4/2004 | Chen et al. .................... | 709/203 |
| 6,773,266 | B1 * | 8/2004 | Dornbush et al. ............. | 434/322 |
| 2004/0254983 | A1 * | 12/2004 | Ando et al. ................... | 709/204 |
| 2006/0084048 | A1 * | 4/2006 | Sanford et al. ................ | 434/323 |
| 2006/0110718 | A1 * | 5/2006 | Lee et al. ...................... | 434/350 |
| 2006/0141441 | A1 * | 6/2006 | Hutchinson et al. .......... | 434/350 |
| 2006/0160055 | A1 * | 7/2006 | Osoegawa ..................... | 434/350 |
| 2006/0286531 | A1 * | 12/2006 | Beamish et al. .............. | 434/323 |
| 2007/0172809 | A1 * | 7/2007 | Gupta ............................ | 434/350 |
| 2007/0178432 | A1 * | 8/2007 | Davis et al. ................... | 434/353 |

(Continued)

OTHER PUBLICATIONS

"Hierarchical Clustering", Online edition (c) Apr. 1, 2009 Cambridge University Press, pp. 377-401, printed from internet: nlp.stanford.edu/IR-Book/pdf/17hier.pdf.

*Primary Examiner* — Jack Yip
(74) *Attorney, Agent, or Firm* — Fox Rothschild LLP

(57) ABSTRACT

Methods and systems of clustering a plurality of students are disclosed. A computing device may receive assessment data for each of a plurality of students. The assessment data includes information pertaining to each of a plurality of questions in an assessment. The computing device may also receive a number of clusters into which to organize the plurality of students. The computing device may determine a similarity value between each pair of students in the plurality of students based on the assessment data associated with each student. The computing device may organize the plurality of students into the number of clusters based on the similarity values.

18 Claims, 6 Drawing Sheets

(56) References Cited

U.S. PATENT DOCUMENTS

2008/0014569 A1* 1/2008 Holiday et al. ............... 434/351
2008/0124696 A1* 5/2008 Houser et al. ................ 434/350
2009/0035733 A1* 2/2009 Meitar et al. ................. 434/118
2009/0075246 A1* 3/2009 Stevens ........................ 434/322
2009/0186328 A1* 7/2009 Robinson et al. ............. 434/350
2010/0075292 A1* 3/2010 DeYoung et al. ............. 434/350
2010/0316986 A1* 12/2010 de la Chica et al. .......... 434/362
2011/0117534 A1* 5/2011 Berger et al. ................. 434/350

* cited by examiner

|       | S9 | S20 | S17 | S19 |
|-------|----|-----|-----|-----|
| Q.001 | C  | C   | C   | C   |
| Q.002 | C  | W   | W   | C   |
| Q.003 | W  | W   | W   | W   |
| Q.004 | C  | C   | C   | C   |
| Q.005 | C  | C   | C   | C   |
| Q.006 | C  | C   | C   | C   |
| Q.007 | W  | C   | C   | C   |
| Q.008 | S  | C   | C   | C   |
| Q.009 | S  | S   | C   | S   |
| Q.010 | S  | S   | S   | S   |

*FIG. 6A*

|       | S2 | S3 | S4 |
|-------|----|----|----|
| Q.001 | C  | C  | C  |
| Q.002 | C  | W  | W  |
| Q.003 | W  | W  | W  |
| Q.004 | C  | C  | C  |
| Q.005 | C  | C  | C  |
| Q.006 | C  | C  | C  |
| Q.007 | W  | S  | W  |
| Q.008 | W  | W  | W  |
| Q.009 | W  | W  | W  |
| Q.010 | W  | W  | W  |

*FIG. 6B*

METHODS AND SYSTEMS FOR CLUSTERING STUDENTS BASED ON THEIR PERFORMANCE

BACKGROUND

Access to information is ubiquitous in today's society. As such, information overload is a significant problem for knowledge workers. The problem of synthesizing information is particularly serious for teachers faced with vast amounts of information regarding student performance that is made available on a regular basis. In the absence of quality tools for making sense of the available information, teachers rely on their instincts and individual judgment to assist their decision making.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a method of clustering a plurality of students may include receiving, by a computing device, assessment data for each of a plurality of students that includes information pertaining to each of a plurality of questions in an assessment, receiving, by the computing device, a number of clusters into which to organize the plurality of students, determining, by the computing device, a similarity value between each pair of students in the plurality of students based on the assessment data associated with each student, and organizing, by the computing device, the plurality of students into the number of clusters based on the similarity values.

In an embodiment, a system for clustering a plurality of students may include a computing device and a computer-readable storage medium in communication with the computing device. The computer-readable storage medium may include one or more programming instructions that, when executed, cause the computing device to receive assessment data for each of a plurality of students that includes data pertaining to each of a plurality of questions in the assessment, receive a number of clusters into which to organize the plurality of students, determine a similarity value between each pair of students in the plurality of students based on the revised assessment data associated with each student, and organize the plurality of students into the number of clusters based on the similarity values.

BRIEF DESCRIPTION OF THE DRAWINGS

FIGS. 6A and 6B depict assessment data associated with students clustered together in exemplary clusters according to an embodiment.

DETAILED DESCRIPTION

The following terms shall have, for the purposes of this application, the respective meanings set forth below.

An "assessment" refers to a set of questions that are presented to a group of individuals. An assessment may include, for example, a test that is intended to be provided to a group of students. Alternately, an assessment may refer to a survey that is intended to be provided to a group of respondents. Alternate assessments that are configured to be provided to respondents may also be considered within the scope of this disclosure.

"Assessment data" refers to information pertaining to each of a plurality of questions in an assessment. Assessment data may include information associated with a plurality of respondents that were presented with the assessment.

A "cluster" refers to a group of information items that are similar in some way. A cluster may refer to a group of respondents or students that are organized based on responses to an assessment or outcomes identified in response to such responses.

A "computing device" refers to a computer, a processor and/or any other component, device or system that performs one or more operations according to one or more programming instructions. An exemplary computing device is described in reference to FIG. 7.

An "outcome" refers to a value that can be provided for an individual element of assessment data. The outcome may refer to an answer, a point total or other information associated with an assessment question for a particular respondent or person being assessed, such as a student.

As used herein, the terms "sum," "product" and similar mathematical terms are construed broadly to include any method or algorithm in which a single datum is derived or calculated from a plurality of input data.

One problem for which teachers depend on intuition is the task of identifying clusters among their students based on the students' performance. By identifying clusters, the common characteristics that define a cluster of students may become visible to a teacher. As such, valuable information may be provided to the teacher because the teacher can tailor customized lesson plans that redress developmental issues, factual deficiencies and/or other issues associated with the students in a particular cluster.

Figure 1:
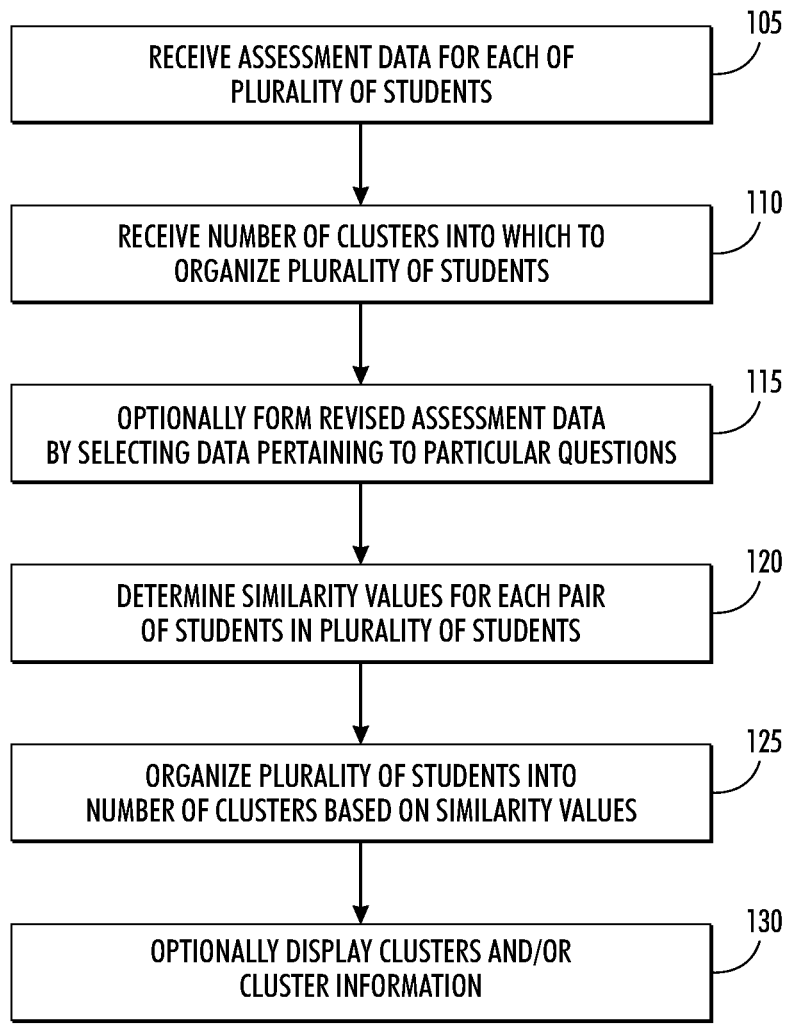
FIG. 1 depicts a flow diagram of an exemplary method of forming clusters based on assessment data for a plurality of students according to an embodiment.

FIG. 1 depicts a flow diagram of an exemplary method of forming clusters based on assessment data for a plurality of students according to an embodiment. As shown in FIG. 1, assessment data may be received 105 for each of a plurality of students. The assessment data may include information pertaining to each of a plurality of questions in an assessment. In an embodiment, the plurality of questions may be an ordered set of questions. In other words, each student may be presented with the plurality of questions in the same order.

In an embodiment, for each question, the information pertaining to the question may include an identification of an outcome for each of the plurality of students. For example, potential outcomes for an assessment may include "C," "W" and "S" (i.e., correct, wrong and skipped). If a first student answered a first question correctly, the assessment data for the first question for the first student may have an outcome of "correct," "C" or the like. Conversely, if a first student answered a first question incorrectly, the assessment data for the first question for the first student may have an outcome of "wrong," "W" or the like. If the first student did not answer the first question, the assessment data for the first question for the first student may have an outcome of "skipped," "S" or the like.

In an alternate embodiment, for each question, the information pertaining to the question may include an answer provided by each of the plurality of students. For example, for a multiple choice assessment, the outcomes may include the potential multiple-choice responses and "no response."

In an alternate embodiment, for each question, the information pertaining to the question for each of the plurality of students may be based on a number of points assigned to the question. For example, if a question is worth up to 5 points, the outcomes may include values between 0 and 5, inclusive. Additional and/or alternate outcomes may be used within the scope of this disclosure.

Table 1 is an exemplary chart denoting exemplary assessment data for ten students for an exemplary ten-question assessment.

TABLE 1

Student Assessment Data for 10 Questions in an Assessment

| | Q1 | Q2 | Q3 | Q4 | Q5 | Q6 | Q7 | Q8 | Q9 | Q10 |
|---|---|---|---|---|---|---|---|---|---|---|
| S1 | C | C | C | W | W | W | W | S | S | C |
| S2 | C | W | C | W | C | C | C | C | S | C |
| S3 | C | S | C | W | W | C | C | C | S | C |
| S4 | C | S | C | W | C | C | C | C | S | C |
| S5 | C | C | C | W | S | C | C | C | S | C |
| S6 | C | C | C | C | W | C | C | C | W | C |
| S7 | C | W | C | S | S | C | C | C | W | C |
| S8 | C | S | C | S | S | W | W | S | W | S |
| S9 | W | C | C | W | W | W | W | S | C | S |
| S10 | C | W | S | C | C | S | W | W | C | C |

Referring back to FIG. 1, a number of clusters into which to organize the plurality of students may also be received 110. In an embodiment, the number of clusters may be received 110 from a user, such as a teacher, instructor, administrator or the like. For example, the user may provide a request that the students be organized into four clusters.

In an alternate embodiment, the number of clusters may be received 110 as a result of a determination by a computing device. The determination of the number of clusters may be performed using a hierarchical clustering algorithm, as is described further below.

Referring back to FIG. 1, information pertaining to one or more of the plurality of questions from the assessment data may optionally be selected 115 to form revised assessment data. In an embodiment, the information may be selected 115 by determining an entropy value for each question in the assessment. Each entropy value may be based on the assessment data associated with the question for the plurality of students. Information pertaining to each question having an entropy value that is greater than a threshold may then be selected 115.

The entropy value for a particular question is determined by the following equation:

$$H(Q_i) = -\sum_{o \in O} p(o) \log p(o),$$

where $Q_i$ is question i, O is the set of potential outcomes for a particular question $Q_i$ and p(o) is the percentage of students having an outcome o. In an embodiment, O may include {C, S, W} (i.e., correct, skipped and wrong). In an alternate embodiment, O may include each of a plurality of multiple-choice responses and "skipped" (e.g., {A, B, C, D, S}). Additional and/or alternate outcomes may be used within the scope of this disclosure.

Once entropy values are determined for each question based on the responses in the assessment data, information pertaining to one or more of the plurality of questions may optionally be selected 115. In an embodiment, information pertaining to the questions in the top X % of highest entropy values may be selected 115. In an alternate embodiment, information pertaining to the questions having the N highest entropy values may be selected 115. The assessment data for the selected questions may be used to form revised assessment data. In an alternate embodiment, information pertaining to all of the questions may be used for the assessment date. Selecting 115 the questions having the highest entropy values, if performed, may reduce the amount of assessment data considered by focusing on the questions having the greatest differentiating effect among students.

A similarity value may be determined 120 between each pair of students in the plurality of students based on the assessment data associated with each student. In an embodiment, the similarity value may be determined 120 based on the Levinshtein distance between the outcome strings (i.e., assessment data) of the two students. The Levinshtein distance between a first outcome string and a second outcome string is equal to the minimum number of edits required to transform the first outcome string into the second outcome string with the allowable operations for each unit of distance being insertion, deletion and substitution of a single character. In an embodiment, substitution of one character for another character may be the only operation that is performed when determining the distance between two outcome strings of assessment data.

In an embodiment, a similarity between two students may be represented by a 3-tuple: $(N_c, N_w, N_s)$, where $N_c$ represents the number of questions that both students answered correctly, $N_w$ represents the number of questions that both students answered incorrectly, and $N_s$ represents the number of questions that both students skipped. A symmetric similarity matrix may be generated based on the similarity tuples between each pair of students. For example, the similarity matrix between students S1, S2, S3 and S4 from Table 1 after Questions 1 and 3 are removed is shown in Table 2 below.

TABLE 2

Student Similarity Matrix

| | S1 | S2 | S3 | S4 |
|---|---|---|---|---|
| S1 | (2, 4, 2) | (1, 1, 1) | (1, 2, 1) | (1, 1, 1) |
| S2 | (1, 1, 1) | (5, 2, 1) | (4, 1, 1) | (5, 1, 1) |
| S3 | (1, 2, 1) | (4, 1, 1) | (4, 2, 2) | (4, 1, 2) |
| S4 | (1, 1, 1) | (5, 1, 1) | (4, 1, 2) | (5, 1, 2) |

From the similarity tuple ($N_c$, $N_w$, $N_s$) between any two students, a similarity value may be determined using the following equation:

Similarity($S_i$,$S_j$)=Weight$_c$*$N_c$+Weight$_w$*$N_w$+ Weight$_s$*$N_S$, where Weight$_c$, Weight$_w$ and Weight$_s$ are weight values associated with the correct, wrong and skipped outcome totals when comparing students $S_i$ and $S_j$. For example, if a higher weight value were assigned to skipped questions, students who skipped similar questions would tend to have a higher similarity score and, accordingly, be more likely to be assigned to the same cluster. In an embodiment, a user, such as a teacher, instructor, administrator or the like, may assign different weights for each of outcome based on the relative importance such user ascribes to each outcome in clustering students. The distance between students $S_i$ and $S_j$ is determined by the following equation:

$$d(S_i, S_j) = \frac{1}{\text{Similarity}(S_i, S_j)}.$$

The plurality of students may be organized 125 into a number of clusters based on the similarity values between each pair of students. In an embodiment, the plurality of students may be organized 125 into a number of clusters based on the distance or similarity values using a hierarchical clustering algorithm.

In an embodiment, the assessment data for each student may initially be assigned to a separate cluster. For each of a plurality of iterations, two clusters may be merged to form a new cluster containing the assessment data for the students assigned to the combined clusters. In an embodiment, the assessment data having the highest similarity value (or the smallest distance value) for a pair of students of the plurality of students may be organized 125 into a cluster in a first iteration of the hierarchical clustering algorithm.

More generally, two clusters each containing assessment data pertaining to one or more students may be combined in each iteration by determining the two clusters that have the smallest distance between them. Determining a distance between two clusters, S and T, may be performed using the following equation:

$$\text{Dist}(S, T) = \frac{1}{|S| + |T|} \sum_{s \in S} \sum_{t \in T} d(s, t),$$

where |S| is the size of cluster S, |T| is the size of cluster T and d(s, t) is the distance between student s and student t. Other methods of determining a distance between two clusters may also be used within the scope of this disclosure.

Figure 2:
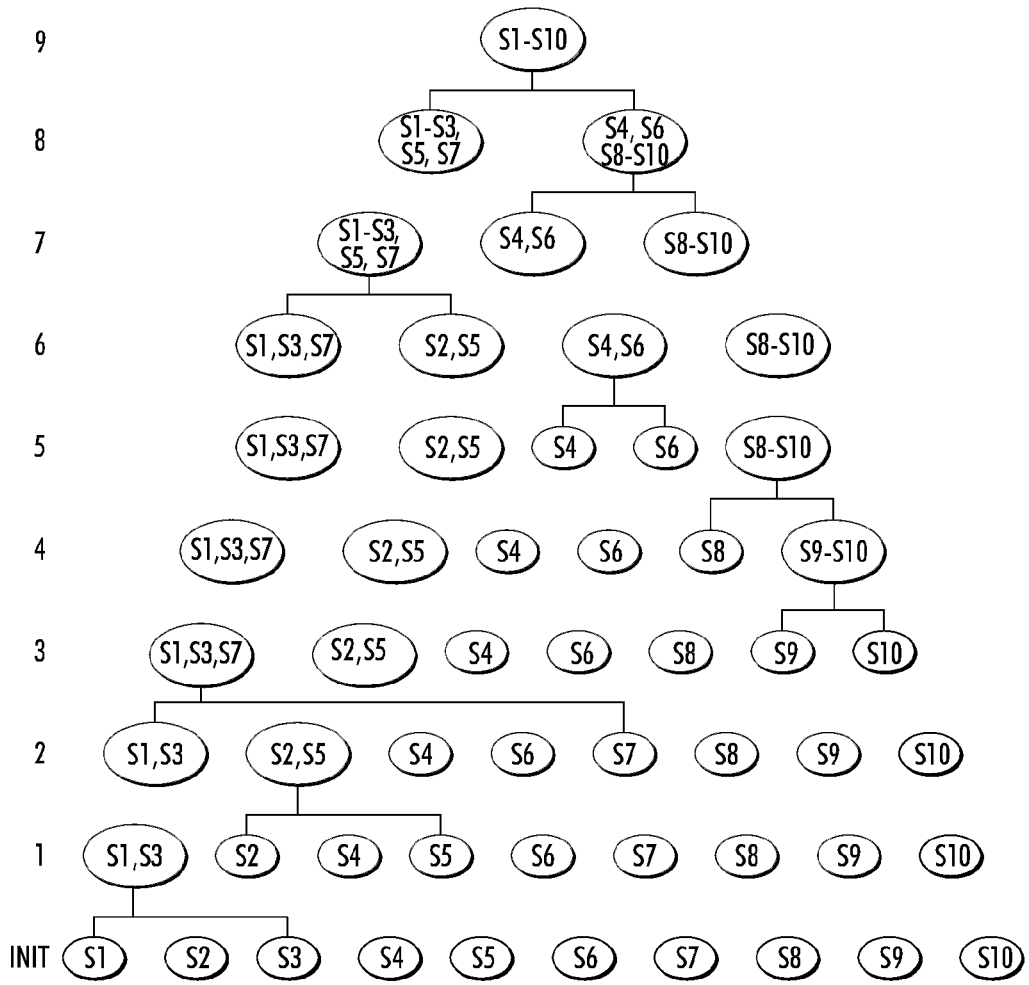
FIG. 2 depicts the sequential organization of exemplary clusters formed by performing iterations of an exemplary hierarchical clustering algorithm.

FIG. 2 depicts the sequential organization of exemplary clusters formed by performing iterations of an exemplary hierarchical clustering algorithm. In particular, FIG. 2 depicts clusters formed based on assessment data for ten students during nine iterations. As shown in FIG. 2, each student is initially in a separate cluster. In each iteration, two clusters are combined into a single cluster as shown in FIG. 2, such as the cluster containing S1 and the cluster containing S3 in iteration 1 or the cluster containing S1, S3 and S7 and the cluster containing S2 and S5 in iteration 7.

In an embodiment, the number of clusters in which to organize 125 the plurality of students may be automatically determined 110 based on the assessment data for the plurality of students. This determination 110 may be performed based on the total error associated with the clusters at each iteration of a hierarchical clustering algorithm.

In an embodiment, the total error may be determined by summing an error for each cluster. The error within a cluster $C_i=\{s_1, s_2, \ldots, s_n\}$, where each $s_x$ represents a student x, may be defined by the following equation:

$$e_i = \sum_{j=1}^{n-1} \sum_{k=j+1}^{n} d(s_j, s_k).$$

Using this formula, the total error for the m clusters ($C_1$, $C_2, \ldots, C_m$) that are present in an iteration may be determined by the following equation:

$$\text{Total Error} = \sum_{i=1}^{m} e_i.$$

In an embodiment, the total error may be determined after each iteration. In such an embodiment, the total error at each iteration is a non-decreasing function. For example, prior to the first iteration (i.e., prior to forming the first combination of two clusters), the total error is zero because each cluster contains a single outcome string for a single student. After the first iteration is performed, the total error is no less than zero and is only equal to zero if the initial clusters that are combined contain assessment data for two students that performed identically on the assessment. If no pair of students performed identically on the assessment, some distance would exist between the assessment data for the combined clusters, and the total error would be non-zero.

Figure 3:
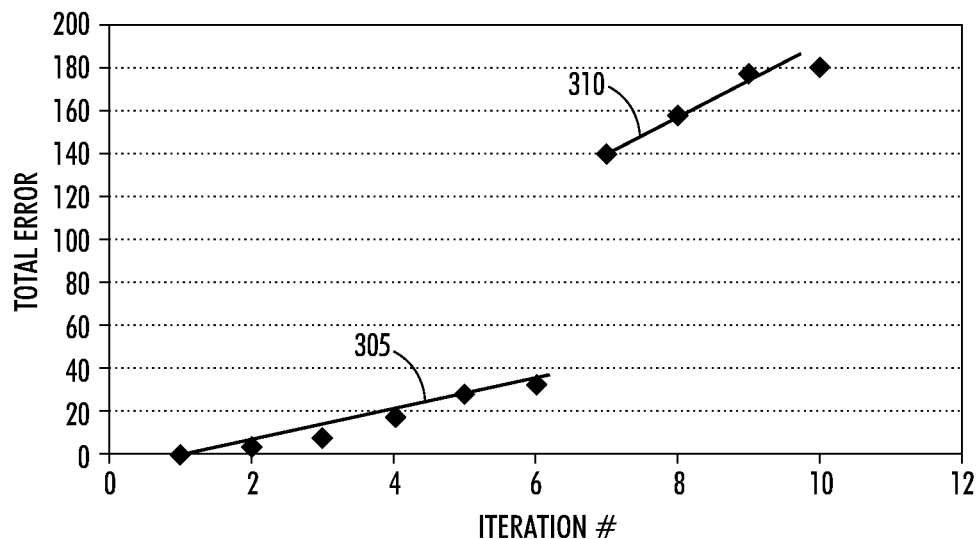
FIG. 3 graphically depicts the total error present in exemplary clusters formed by performing iterations of an exemplary hierarchical clustering algorithm.

FIG. 3 graphically depicts the total error present in exemplary clusters formed when performing iterations of an exemplary hierarchical clustering algorithm. In particular, FIG. 3 depicts the total error for each iteration of an exemplary hierarchical clustering algorithm as applied to assessment data for a plurality of students. In the example shown in FIG. 3, two clusters that were very dissimilar were combined in iteration 7, as noted by the substantial increase in total error at such iteration.

Figure 4:
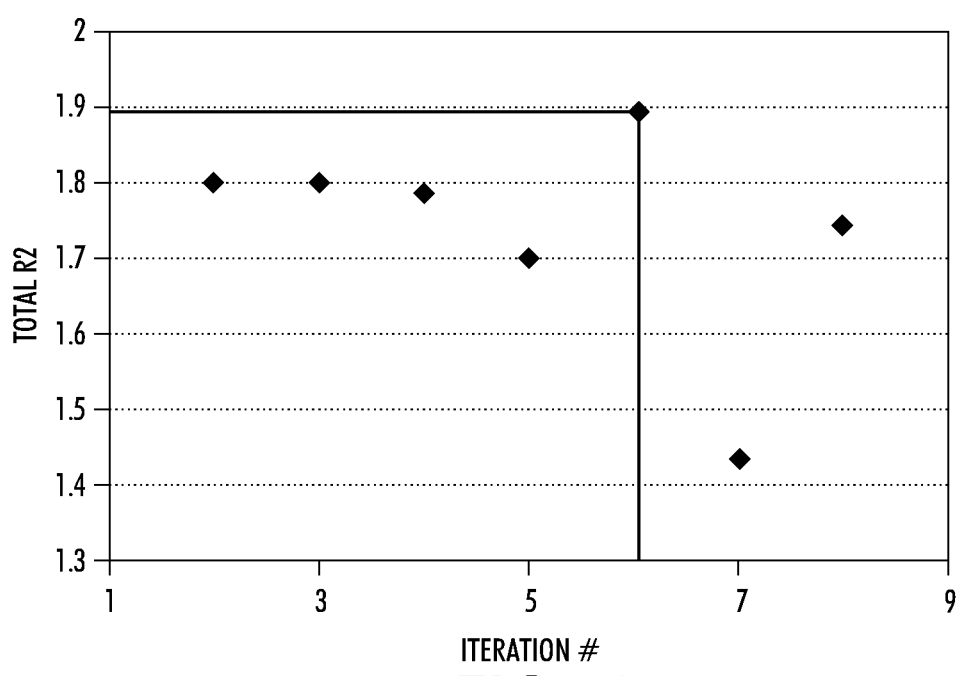
FIG. 4 depicts values for the coefficient of determination using linear regression for each iteration of an exemplary hierarchical clustering algorithm.

In an embodiment, the iteration in which the biggest jump in total error occurred may be automatically determined. Jump detection is a common signal processing and statistical operation for which numerous algorithms are available and known to those of ordinary skill in the art. An exemplary algorithm is described below. Two linear regression lines 305, 310 may be fit to the total error values for each of a plurality of iterations. In the first iteration, the first linear regression line may include a regression of the first two total error values, and the second linear regression line may include a regression of the remaining total error values. In the second iteration, the first linear regression line may include a regression of the first three total error values, and the second linear regression line may include a regression of the remaining total error values. This process repeats until the second linear regression includes a regression of the last two total error values. For each iteration, the total $R^2$ values for the two linear regression lines are noted. $R^2$ is used to denote the coefficient of determination, which is equal to the following equation:

$$R^2 = \frac{\sum_i (f_i - \bar{y})^2}{\sum_i (y_i - \bar{y})^2},$$

where $f_i$ are the predicted values for the total error based on the output of a linear regression model, $y_i$ are the actual values for the total error based on the total error computation, and $\bar{y}$ is the mean of the actual values. FIG. 4 depicts values for $R^2$ for an exemplary linear regression. As depicted in FIG. 4, $R^2$ has its maximum value at iteration 6 of the linear regression (i.e., a regression of the first 7 error values and a regression of the last 4 error values). As such, the number of clusters may be determined 110 to be the clusters described in iteration 6 of the hierarchical clustering algorithm (i.e., 4 clusters in the present example). The linear regression lines 305, 310 in FIG. 3 depict linear regression for the first and second groups of total error values at the best case solution.

Figure 5:
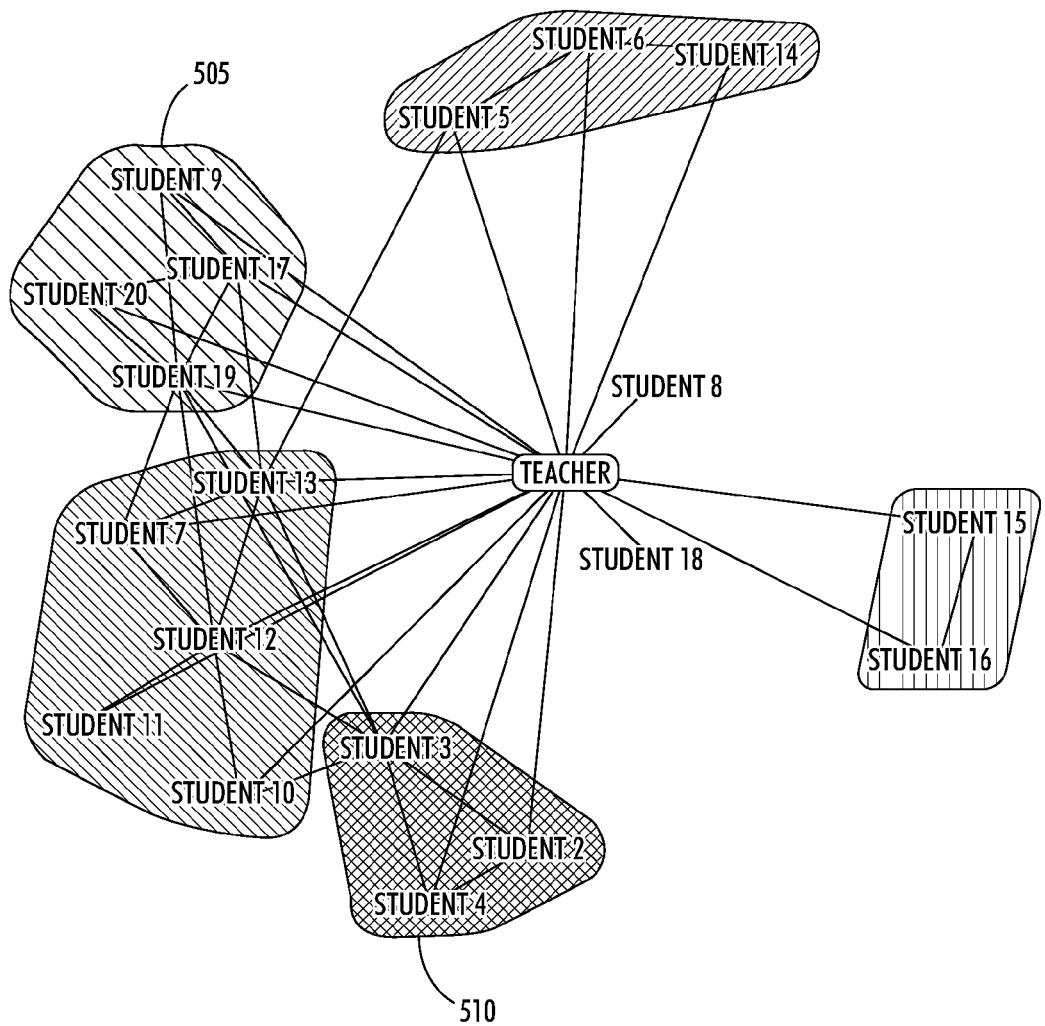
FIG. 5 depicts an exemplary graphical display identifying clusters used to organize a plurality of students according to an embodiment.

Referring back to FIG. 1, the clusters and/or cluster information may optionally be displayed 130 to a user. In an embodiment, each displayed cluster may include an identification of each of the one or more students associated with the cluster. FIG. 5 depicts an exemplary graphical display identifying seven clusters used to organize a plurality of students. For example, Students 9, 17, 19 and 20 are organized into a first cluster 505 and Students 2 through 4 are organized into a second cluster 510. Students 8 and 18 are each organized into a cluster of which they are the only member.

In an embodiment, if a user selects a particular cluster, such as the first cluster 505 or the second cluster 510, information pertaining to the students in the respective cluster may be displayed 130. For example, FIG. 6A illustrates assessment data for each student in the first cluster 505 and FIG. 6B illustrates assessment data for each student in the second cluster 510.

Using such information, a user can identify any areas of concern for the students in a displayed cluster. For example, FIG. 6A shows that each of the students in the first cluster 505 skipped questions towards the end of the assessment. As such, the user may decide that the students in the first cluster 505 require additional training on how to budget their time appropriately when taking an assessment in order to complete the assessment within the duration of the assessment. Similarly, FIG. 6B shows that each of the students in the second cluster 510 missed questions at the end of the assessment. As such, the user may decide that the students in the second cluster 510 require additional tutoring on the subject matter of, for example, questions 8-10. It is noted that the exemplary conclusions drawn above based on the assessment data in FIGS. 6A and 6B are merely intended to be illustrative and are not the only conclusions that could be drawn by an individual user based on such assessment data or other assessment data.

Figure 7:
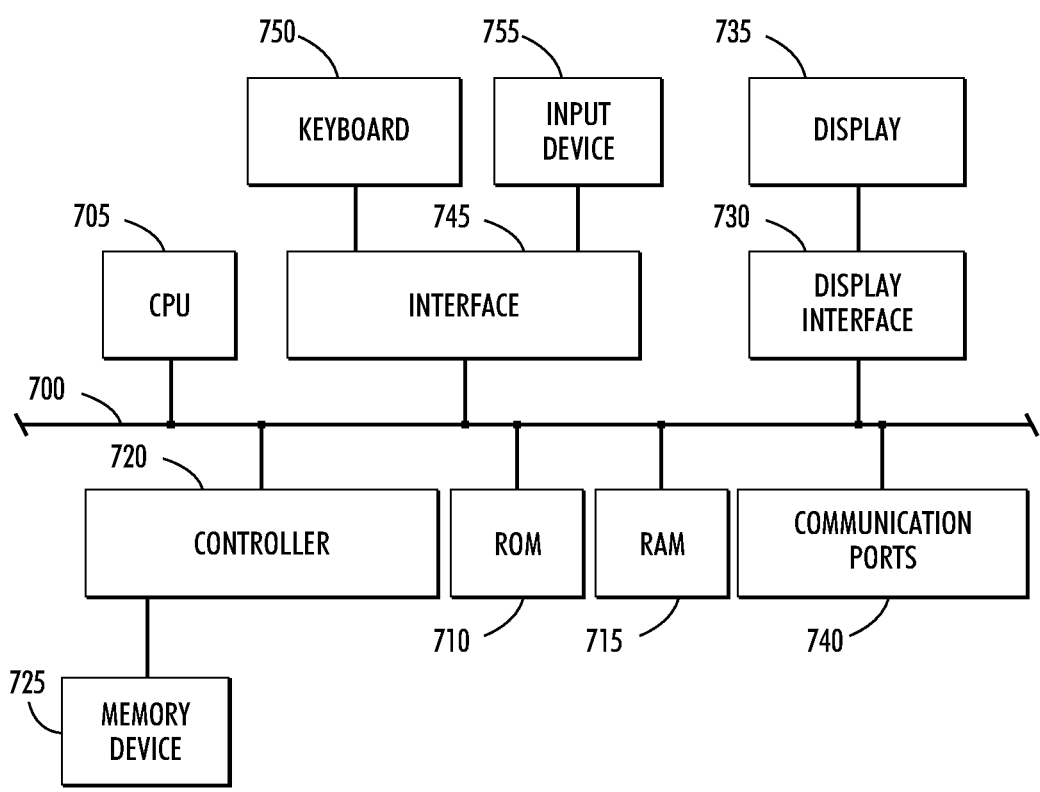
FIG. 7 depicts a block diagram of exemplary internal hardware that may be used to contain or implement program instructions according to an embodiment.

FIG. 7 depicts a block diagram of exemplary internal hardware that may be used to contain or implement program instructions, such as the process steps discussed above in reference to FIG. 1, according to embodiments. A bus 700 serves as the main information highway interconnecting the other illustrated components of the hardware. CPU 705 is the central processing unit of the system, performing calculations and logic operations required to execute a program. CPU 705, alone or in conjunction with one or more of the other elements disclosed in FIG. 7, is an exemplary processing device, computing device or processor as such terms are used within this disclosure. Read only memory (ROM) 710 and random access memory (RAM) 715 constitute exemplary memory devices.

A controller 720 interfaces with one or more optional memory devices 725 to the system bus 700. These memory devices 725 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 710 and/or the RAM 715. Optionally, the program instructions may be stored on a tangible computer readable medium such as a compact disk, a digital disk, flash memory, a memory card, a USB drive, an optical disc storage medium, such as a Blu-Ray™ disc, and/or other recording medium.

An optional display interface 730 may permit information from the bus 700 to be displayed on the display 735 in audio, visual, graphic or alphanumeric format. Communication with external devices, such as a print device, may occur using various communication ports 740. An exemplary communication port 740 may be attached to a communications network, such as the Internet or an intranet.

The hardware may also include an interface 745 which allows for receipt of data from input devices such as a keyboard 750 or other input device 755 such as a mouse, a joystick, a touch screen, a remote control, a pointing device, a video input device and/or an audio input device.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method of clustering a plurality of students, the method comprising:
  receiving, by a computing device, assessment data for each of a plurality of students, wherein the assessment data comprises information pertaining to each of a plurality of questions in an assessment;
  receiving, by the computing device, a number of clusters into which to organize the plurality of students, wherein receiving a number of clusters comprises:
    determining a plurality of sets of clusters using an iterative hierarchical clustering algorithm, wherein each iteration of the hierarchical clustering algorithm results in each set of clusters comprising at least two clusters such that each set of clusters comprises assessment data pertaining to two or more students of the plurality of students,
    determining iterative error values for each set of clusters during each iteration of the hierarchical clustering algorithm,
    determining a total error value based upon a summation of the iterative error values, and
    automatically determining the number of clusters based on the total error value;
  determining, by the computing device, a similarity value between each pair of students in the plurality of students based on the assessment data associated with each student; and
  organizing, by the computing device, the plurality of students into the number of clusters based on the similarity values.

2. The method of claim 1, wherein the assessment data comprises, for each student and for each question, an indication that the student answered the question correctly, answered the question incorrectly, or did not answer the question.

3. The method of claim 2, wherein determining the similarity value between each pair of students in the plurality of students comprises, for each pair of students:
  determining a first number of questions that each of the pair of students answered correctly;

determining a second number of questions that each of the pair of students answered incorrectly;

determining a third number of questions that each of the pair of students did not answer; and determining a similarity value equal to the sum of the product of the first number and a first weight, the product of the second number and a second weight, and the product of the third number and a third weight.

4. The method of claim 3, further comprising:

receiving, by the computing device, the first weight, the second weight, and the third weight from a user.

5. The method of claim 1, wherein receiving a number of clusters comprises receiving a number of clusters from a user.

6. The method of claim 1, wherein the iterative error value for each cluster is based on a distance between assessment data for each pair of students in the cluster.

7. The method of claim 1, further comprising:

selecting, by the computing device, information pertaining to one or more of the plurality of questions from the assessment data to form revised assessment data.

8. The method of claim 7, wherein selecting information pertaining to one or more of the plurality of questions comprises:

determining an entropy value for each question in the assessment, wherein the entropy value for each question in the assessment is based on the assessment data associated with the question for the plurality of students; and selecting information pertaining to each question having an entropy value that is greater than a threshold.

9. The method of claim 1, further comprising:

causing, by the computing device, the clusters to be displayed, wherein each displayed cluster comprises an identification of each of the one or more students associated with the displayed cluster.

10. A system for clustering a plurality of students, the system comprising:

a computing device;

a non-transitory computer-readable storage medium in communication with the computing device, wherein the non-transitory computer-readable storage medium comprises one or more programming instructions that, when executed, cause the computing device to:

receive assessment data for each of a plurality of students, wherein the assessment data comprises data pertaining to each of a plurality of questions in the assessment, receive a number of clusters into which to organize the plurality of students, wherein the one or more programming instructions to receive a number of clusters comprises one or more programming instructions that, when executed, cause the computing device to:

determine a plurality of sets of clusters using an iterative hierarchical clustering algorithm, wherein each iteration of the hierarchical clustering algorithm results in each set of clusters comprising at least two clusters such that each set of clusters comprises assessment data pertaining to two or more students of the plurality of students, determine iterative error values for each set of clusters during each iteration of the hierarchical clustering algorithm, determine a total error value based upon a summation of the iterative error values, and automatically determine the number of clusters based on the total error value, determine a similarity value between each pair of students in the plurality of students based on the revised assessment data associated with each student, and organize the plurality of students into the number of clusters based on the similarity values.

11. The system of claim 10, wherein the assessment data comprises, for each student and for each question, an indication that the student answered the question correctly, answered the question incorrectly, or did not answer the question.

12. The system of claim 11, wherein the one or more programming instructions to determine the similarity value between each pair of students in the plurality of students comprise, for each pair of students, one or more programming instructions that, when executed, cause the computing device to:

determine a first number of questions that each of the pair of students answered correctly;

determine a second number of questions that each of the pair of students answered incorrectly;

determine a third number of questions that each of the pair of students did not answer; and determine a similarity value equal to the sum of the product of the first number and a first weight, the product of the second number and a second weight, and the product of the third number and a third weight.

13. The system of claim 12, wherein the one or more programming instructions, when executed, further cause the computing device to receive the first weight, the second weight, and the third weight from a user.

14. The system of claim 10, wherein the one or more programming instructions to receive a number of clusters comprises one or more programming instructions that, when executed, cause the computing device to receive a number of clusters from a user.

15. The system of claim 10, wherein the iterative error value for each cluster is based on a distance between assessment data for each pair of students in the cluster.

16. The system of claim 10, wherein the one or more programming instructions, when executed, further cause the computing device to select information pertaining to one or more of the plurality of questions from the assessment data to form revised assessment data.

17. The system of claim 16, wherein the one or more programming instructions to select information pertaining to one or more of the plurality of questions comprises one or more programming instructions that, when executed, cause the computing device to:

determine an entropy value for each question in the assessment; and remove data pertaining to each question having an entropy value that is less than a threshold from the assessment data.

18. The system of claim 10, wherein the one or more programming instructions, when executed, further cause the computing device to cause the clusters to be displayed, wherein each displayed cluster comprises an identification of each of the one or more students associated with the displayed cluster.

* * * * *